United States Patent
McAfee et al.

(10) Patent No.: US 7,293,125 B2
(45) Date of Patent: *Nov. 6, 2007

(54) DYNAMIC RECONFIGURATION OF PCI EXPRESS LINKS

(75) Inventors: Martin McAfee, Austin, TX (US);
Louis N. Castro, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/468,222

(22) Filed: Aug. 29, 2006

(65) Prior Publication Data

US 2007/0073959 A1 Mar. 29, 2007

Related U.S. Application Data

(63) Continuation of application No. 10/702,832, filed on Nov. 6, 2003, now Pat. No. 7,099,969.

(51) Int. Cl.
*G06F 13/00* (2006.01)
(52) U.S. Cl. .............. 710/107; 710/307; 710/311; 710/313
(58) Field of Classification Search .............. None
See application file for complete search history.

(56) References Cited

U.S. PATENT DOCUMENTS

| | | | |
|---|---|---|---|
| 6,256,700 B1 * | 7/2001 | Sauber | 710/316 |
| 6,535,939 B1 * | 3/2003 | Arimilli et al. | 710/116 |
| 6,665,742 B2 * | 12/2003 | Owen et al. | 710/10 |
| 6,918,001 B2 | 7/2005 | Fanning | 710/316 |
| 2002/0135682 A1 * | 9/2002 | Oka et al. | 348/211.3 |
| 2004/0088469 A1 * | 5/2004 | Owen et al. | 710/316 |
| 2005/0012747 A1 * | 1/2005 | Sauber | 345/501 |

FOREIGN PATENT DOCUMENTS

| EP | 1 253 519 | * 10/2002 |
|---|---|---|
| EP | 1 480 471 | * 11/2004 |

OTHER PUBLICATIONS

"Creating a Third Generation I/O Inerconuect" by Ajay V. Bhatt, Technology and Research Labs, Intel Corporation, White Paper, 11 pages, 2002.*
PCI Express Base Specification Revision 1.0a, PCI-SIG, pp. 1-15, 27-35, and 167-185, Apr. 15, 2003.*
"Splitting a PCI-Express Port Into Two or More Independent PCI-Express Links", Oct. 15, 2003, available from the Internet at www.priorartdatabase.com/IPCOMJ000019988.*
German Office Action for German Patent Application No. 10 2004 053 801.8 (10 pages).

* cited by examiner

*Primary Examiner*—Glenn A. Auve
(74) *Attorney, Agent, or Firm*—Baker Botts L.L.P.

(57) ABSTRACT

A method and circuitry for dynamically reconfiguring the links of a PCI Express bus. A computer system has been initially configured with PCI Express bus links to various endpoints, using the scaling features of the PCI Express standard. During operation of the computer system, the status of the endpoints is detected and unused links (or unused portions of links) are rerouted to other endpoints.

22 Claims, 2 Drawing Sheets

DYNAMIC RECONFIGURATION OF PCI EXPRESS LINKS

RELATED APPLICATION

This application is a continuation of U.S. patent application Ser. No. 10/702,832 filed Nov. 6, 2003, now U.S.Pat. No. 7,099,969 the contents of which is hereby incorporated in its entirety by reference.

TECHNICAL FIELD OF THE INVENTION

This invention relates to computer systems and more particularly to bus connections for computer systems.

BACKGROUND OF THE INVENTION

A computer's components, including its processor, chipset, cache, memory, expansion cards and storage devices, communicate with each other over one or more "buses". A "bus", in general computer terms, is a channel over which information flows between two or more devices. A bus normally has access points, or places to which a device can connect to the bus. Once connected, devices on the bus can send to, and receive information from, other devices.

Today's personal computers tend to have at least four buses. Each bus is to some extent further removed from the processor; each one connects to the level above it.

The Processor Bus is the highest-level bus, and is used by the chipset to send information to and from the processor. The Cache Bus (sometimes called the backside bus) is used for accessing the system cache. The Memory Bus connects the memory subsystem to the chipset and the processor. In many systems, the processor and memory buses are the same, and are collectively referred to as the frontside bus or system bus.

The local I/O (input/output) bus connects peripherals to the memory, chipset, and processor. Video cards, disk storage devices, and network interface cards generally use this bus. The two most common local I/O buses are the VESA Local Bus (VLB) and the Peripheral Component Interconnect (PCI) bus. An Industry standard architecture (ISA) I/O Bus may also be used for slower peripherals, such as mice, modems, and low speed sound and networking devices.

The current generation of PCI bus is known as the PCI Express bus. This bus is a high-bandwidth serial bus, which maintains software compatibility with existing PCI devices.

SUMMARY OF THE INVENTION

One aspect of the invention is a method of reconfiguring links of a PCI Express bus. The status of bus endpoints is detected, such as whether the endpoints are populated and how much bandwidth the endpoints need. Based on this detection, all or a portion of a link having unused bandwidth may be switched to another endpoint.

For example, all lanes of a link routed to an unpopulated endpoint may be rerouted to a populated endpoint. Or, as another example, one or more lanes of a link routed to an endpoint that needs less bandwidth than provided by that link, may be switched to an endpoint needing more bandwidth.

An advantage of the invention is that it helps to overcome bandwidth limitations of the PCI Express bus. Dynamic reconfiguration of PCI Express lanes permits unused bandwidth to be switched to other devices on the bus.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
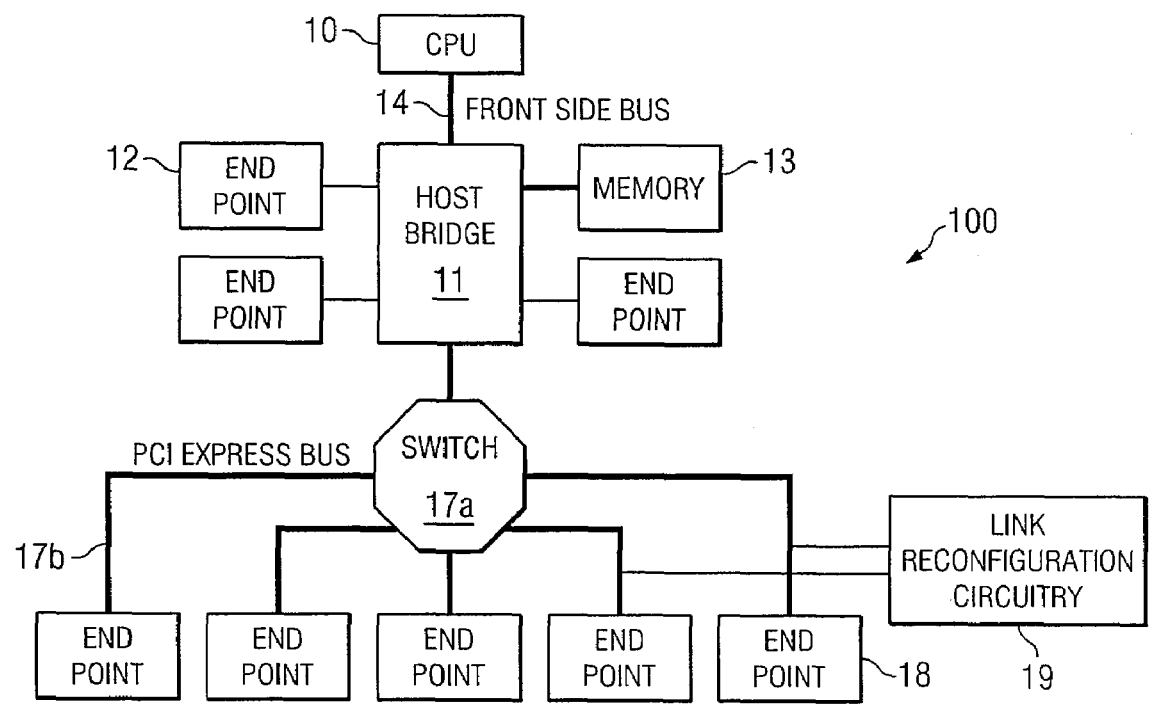
FIG. 1 illustrates various internal elements of an information handling system in accordance with the invention.

FIG. 1 illustrates various internal elements of an information handling system 100 in accordance with the invention. As explained below, system 100 has a PCI Express bus 17, as well as additional circuitry 19 that dynamically reconfigures one or more links 17b of the bus. PCI Express bus 17 is used in the conventional manner for connecting peripheral components, but is enhanced so that the status of an endpoint 17c may be detected and the bandwidth for that endpoint rerouted if not needed for that endpoint.

In the embodiment of FIG. 1, system 100 is typical of a personal computer system, but could be some other type of information handling system, such as a server, workstation, or an embedded system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, ROM, and/or other types of nonvolatile memory. Additional components of the information handling system may include one or more disk drives, one or more network ports for communicating with external devices, as well as various input and output (I/O) devices, such as a keyboard, a mouse, and a video display. The information handling system may also include one or more buses operable to transmit communications between the various hardware components.

CPU 10 may be any central processing device. An example of a typical CPU 10 is one from the Pentium family of processors available from Intel Corporation. For purposes of the invention, CPU 10 is at least programmed to execute an operating system having BIOS (basic input/output system) programming.

Host bridge 11 (often referred to as a Northbridge) is a chip (or part of a chipset) that connects CPU 10 to endpoints 12, memory 13, and to the PCI Express bus 17. The types of endpoints 12 connected to host bridge 11 depend on the application. For example if system 100 is a desktop computer, endpoints 12 are typically a graphics adapter, HDD (via a serial ATA link), and local I/O (via a USB link). For a server, endpoints 12 are typically GbE (gigabit Ethernet) and IBE devices and additional bridge devices.

Communications between the CPU 10 and host bridge 11 are via a front side bus 14.

PCI Express bus 17 comprises switch fabric 17a and links 17b, by means of which a number of PCI endpoints 45 may be connected. The switch fabric 17a provides fanout from host bridge 11 to links 17b, and provides link scaling.

"Link scaling" means that the available bandwidth of the PCI Express bus 17 is allocated, such that a predetermined number of links 17b, each having a size conforming to PCI Express architecture standards, are physically routed to endpoints 18. Each link 17b comprises one or more lanes. A link having a single lane (referred as having a x1 width) has two low-voltage differential pairs; it is a dual simplex serial connection between two devices. Data transmission between the two devices is simultaneous in both directions. Scalable performance is achieved through wider link widths (x1, x2, x4, x8, x16, x32). Links are scaled symmetrically, with the same number of lanes in each direction.

PCI endpoints 18 may be peripherical devices or chips, physically connected using card slots or other connection mechanisms. The particular endpoints 45 connected to PCI Express bus 17 depend on the type of application of system 100. For a desktop computer system, examples of typical PCI endpoints 18 are mobile docking adapters, Ethernet adapters, and other add in devices. For a server platform, endpoints 45 could be gigabit Ethernet connections, and additional switching capability for I/O and cluster interconnections. For a communications platform, endpoints 18 could be line cards.

In a conventional PCI Express bus 17, the switching fabric 17a is a logical element implemented as a separate component or as part of a component that includes host bridge 11. As explained below, in the present invention, the PCI Express bus 17 operates in conjunction with additional switching and control circuitry 19. This circuitry 19 detects the status of endpoints 45 and is capable of switching links from one endpoint to another.

Figure 2:
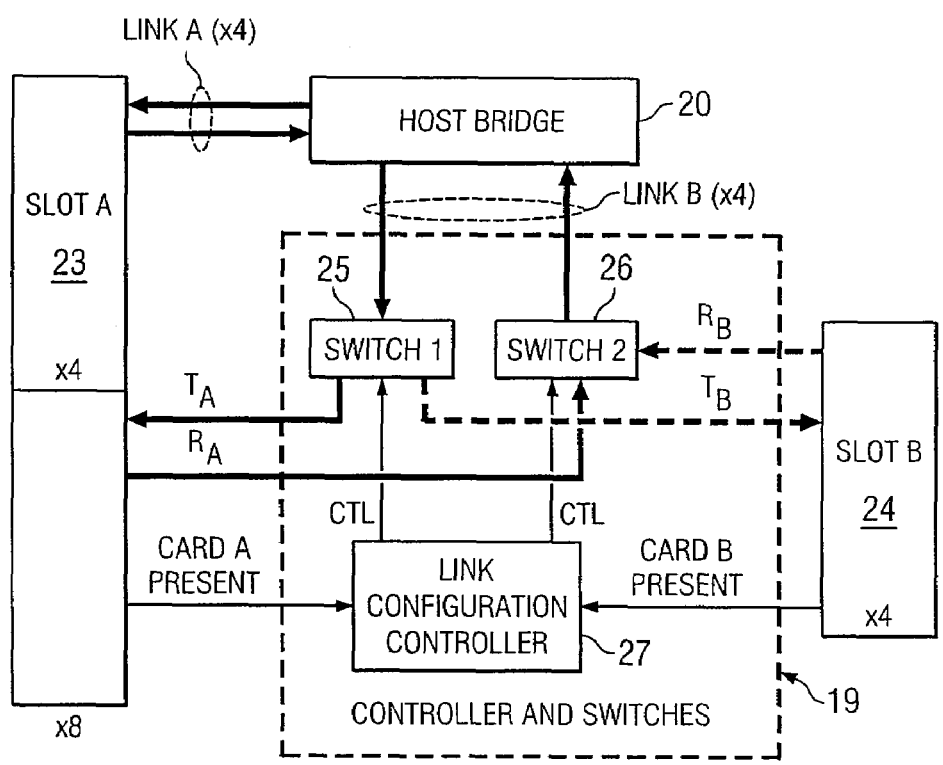
FIG. 2 illustrates a portion of the system of FIG. 1, and further illustrates a first example of reconfiguring a link.

FIG. 2 is a partial view of system 100, and illustrates dynamic reconfiguration of PCI Express links 17b in accordance with the invention. Each link 17b is illustrated as two pairs of signals—a transmit pair and a receive pair. Transmit pairs are identified as T signals and receive pairs as R signals.

Slots 23 and 24 are designed for connecting card type endpoints 45. Although only two slots are shown, any number of slot configurations are possible depending on the desired scaling (x1, x4, etc) of the links. Slots 23 and 24 represent physical locations, typically within the computer chassis of system 100, where cards for various I/O devices may be installed. In other embodiments, system 100 could have one or more chip connections in addition to or instead of slot connections. For generality, the term "endpoint connection" could be used to refer collectively to the connection for chips, cards, or any other type of endpoint.

In the example of FIG. 1, slot 23 is configured with a x4 link width (Link A). Slot 24 is configured with a x4 link width (Link B).

Reconfiguration is accomplished using switches 25 and 26 and a link configuration controller 27. It should be understood that FIG. 2 is an example, and many different variations of the switching and control circuitry are possible, with varying numbers of links, slots, and switches, and various link widths.

Link configuration controller 27 detects whether slots 23 and 24 are populated (in use). Because PCI bus 40 permits slots to be "hot plugged" and "hot swapped", this detection is dynamic in the sense that whenever device is installed or uninstalled in a slot 23 or 24, controller 27 immediately detects that event.

Link configuration controller 27 may be implemented with a programmable logic device, and may be stand alone logic circuitry or may be integrated with other system logic. For example, link configuration controller could be integrated into host bridge 20.

If slot's status (populated or unpopulated) changes, controller 27 delivers a signal to switches 25 and 26. Switches 25 and 26 may be implemented with high speed switching devices. Like controller 27, switches 25 and 26 could be integrated with other circuitry, such as with controller 27 and/or with host bridge 20.

In the example of FIG. 2, Link B has a switch 25 on its transmit lanes and a switch 26 on its receive lanes. Switches 25 and 26 are both operable to switch Link B to either slot 23 or slot 24. If Link B is switched to slot 23, slot 23 receives a x8 link. If Link B is switched to slot 24, slot 24 receives a x4 link. It is assumed that appropriate physical connections between switches 25 and 26 and slot 23 have been made so that the switching between the alternative paths is possible.

In the example, Slot 23 is populated and slot 24 is unpopulated. This status has been detected by controller 27, which has set switches 25 and 26 to switch all of Link B to slot 23.

Figure 3:
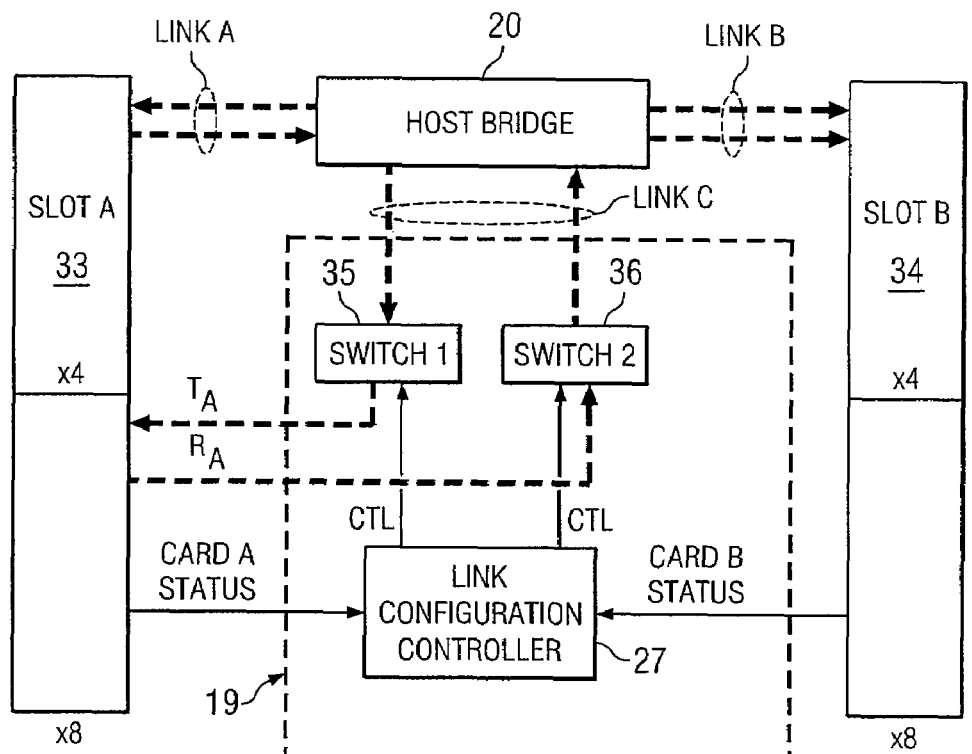
FIG. 3 illustrates a second example of reconfiguring a link.

FIG. 3 illustrates another example of operation of the invention. In this example, both slots 33 and 34 are populated. The system has been configured with three x4 links. Link A is a x4 link and is routed to slot 33. Link B is also a x4 link and is routed to Slot B. Link C is a x4 link, and is routed to switches 35 and 36, making it a "switchable" link.

Controller 27 has detected that both slots 33 and 34 are populated, but has also detected that slot 33 requires a x8 link and that slot 34 needs only a x4 link. In response, controller 27 has delivered a control signal to switches 35 and 36 such that Link C is routed to slot 33, making it a x8 slot. For this example, it is assumed that the cards populating slots 33 and 34 have some means of informing controller 27 (directly or through the operating system of system 100) of their bandwidth requirements.

Figure 4:
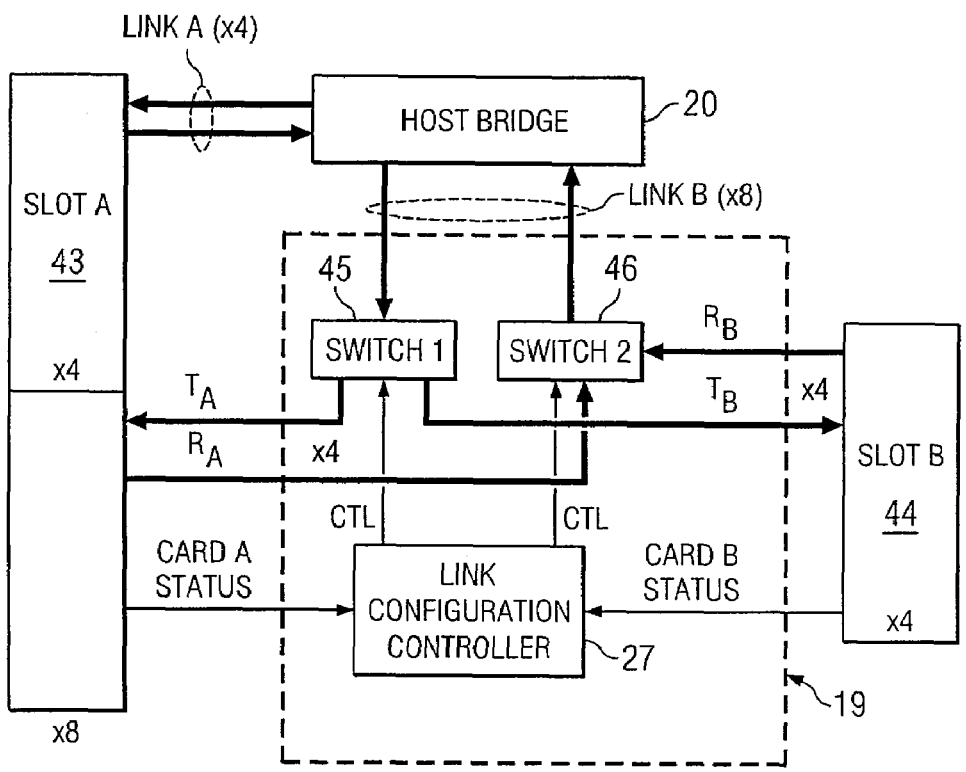
FIG. 4 illustrates a third example of reconfiguring a link.

FIG. 4 illustrates a third example, where switches are used to reconfigure a link to an endpoint such that only a portion of the link is rerouted. In the example of FIG. 4, the existing configurations of slot 43 and slot 44 are x4 and x8 respectively. However, a x8 endpoint has been placed in slot 43 and a x4 endpoint has been placed in slot 44. Controller 27 has detected the status and bandwidth needs of both slots, and has operated switches 45 and 46 so that a portion of link B is rerouted to slot 43. In a variation of this example, slot 44 could be unpopulated and Link B switched so it is divided into a x4 path to slot 43 and a x4 path to some other endpoint.

The examples described above accomplish "reconfiguration" in the sense that they reroute existing links, that is, links already been physically routed to various endpoints on the bus. In the absence of the invention, the PCI Express bus would operate in accordance with whatever link configuration was established at initialization of system 100. Furthermore, the method and circuitry of the above described examples are "dynamic" in the sense that the status detection and switching occur while system 100 is being powered for operation (during start up) and while the operating system is running. Thus, the status detection is of the real-time (current) status of an endpoint. The detection and switching of the present invention operate on links that have been previously scaled in accordance with the scaling capabilities of a PCI Express bus. It is a dynamic reconfiguration, as compared to the static configuration resulting from scaling.

In the examples above, controller 27 both detects the status of the slots and delivers control signals to the configuration switches. In other embodiments, one or both of these functions could be performed by the operating system of system 100, such as by its BIOS. That is, BIOS could be programmed to detect the status of slots on its PCI Express bus 40 and/or to switch lanes in response to the status. Thus, in various embodiments, the detection and switching functions of the present invention can be hardware or software controlled.

Reconfiguration could be useful without the "dynamic" detection aspects of the invention. In other words, there may be situations when it would be desirable to manually reroute existing PCI Express bus links. For example, a card requiring a x8 link might physically fit in a slot within a chassis that has a x4 link. The x8 card could be switched with a x4 card and their links rerouted.

What is claimed is:

1. A method of reconfiguring links of a PCI Express bus of an information handling system, the links being routed to endpoints on the bus, comprising the steps of:
   detecting the status of one or more of the endpoints; and
   switching all of a link from one endpoint to more than one other endpoint, based on the result of the detecting step.

2. The method of claim 1, wherein detecting the status and switching of an endpoint occur while the system is being powered for operation and while the operating system is running.

3. The method of claim 1, wherein the detecting step is performed by detecting whether an endpoint is populated.

4. The method of claim 3, wherein the switching step is performed by switching a link from an unpopulated endpoint to one or more populated endpoints.

5. The method of claim 1, wherein the detecting step is performed by detecting the bandwidth requirements of devices installed at populated endpoints.

6. The method of claim 1, wherein the switching step is performed with switches external to the PCI Express bus switching fabric.

7. The method of claim 1, wherein the information handling system has an operating system, and the detecting step is performed using circuitry external to the operating system.

8. The method of claim 1, wherein the information handling system has an operating system, and the detecting step is performed using the operating system.

9. The method of claim 1, wherein the information handling system is in operation during the detecting and switching steps.

10. Circuitry for reconfiguring links of a PCI Express bus of an information handling system, the links being routed to endpoints on the bus, comprising:
    a controller for detecting the status of one or more of the endpoints; and
    switches associated with at least one of the links, operable to switch all of that link from one endpoint to more than one other endpoint, in response to a signal from the controller.

11. The circuitry of claim 10, where the controller detects the status and the switches switch the links while the system is powered for operating and while an operating system is running.

12. The circuitry of claim 10, wherein the controller detects whether an endpoint is populated.

13. The circuitry of claim 12, wherein the switches are operable to switch a link from an unpopulated endpoint to one or more populated endpoints.

14. The circuitry of claim 10, wherein the controller detects the bandwidth requirements of devices installed at populated endpoints.

15. The circuitry of claim 10, wherein the switches are external to the PCI Express bus switching fabric.

16. The circuitry of claim 10, wherein the information handling system has a host bridge, and wherein the controller is integrated into the host bridge.

17. The circuitry of claim 10, wherein the signal from the controller is direct to the switches.

18. The circuitry of claim 10, wherein the signal from the controller is through the operating system of the information handling system.

19. An information handling system, comprising:
    a central processing unit (CPU);
    memory for storing programming executable by the CPU;
    a host bridge for connecting the CPU and memory;
    a PCI Express bus for connecting input/output endpoints to the system, and having a switch fabric and links from the host bridge to the endpoints;
    wherein the host bridge further connects the bus to the CPU and memory; and
    link reconfiguration circuitry for reconfiguring links of the PCI Express bus, the links being routed to endpoints on the bus, comprising:
       a controller for detecting the status of one or more of the endpoints; and
       switches associated with at least one of the links, operable to switch all of that link from one endpoint to more than one other endpoint, in response to a signal from the controller.

20. The system of claim 19, wherein the controller detects the bandwidth requirements of devices installed at populated endpoints.

21. The system of claim 19, wherein the switches are external to the PCI Express bus switching fabric.

22. The system of claim 19, wherein the controller is integrated into the host bridge.

* * * * *